United States Patent [19]

Gobeli

[11] Patent Number: 4,536,746
[45] Date of Patent: Aug. 20, 1985

[54] TRANSDUCER FOR CONVERTING THREE DIMENSIONAL MECHANICAL INPUT DISPLACEMENTS INTO A CORRESPONDING ELECTRICAL OUTPUT SIGNAL

[75] Inventor: Garth W. Gobeli, Albuquerque, N. Mex.

[73] Assignee: The Mercado Venture, Edgewood, N. Mex.

[21] Appl. No.: 428,781

[22] Filed: Sep. 30, 1982

[51] Int. Cl.³ .............................................. G08C 9/00
[52] U.S. Cl. .......................... 340/365 A; 74/471 XY; 200/6 A; 340/870.30
[58] Field of Search .................. 74/474 XY; 200/6 A; 340/365 A, 365 R, 706, 711, 709, 870.03, 870.3; 178/18, 19

[56] References Cited

U.S. PATENT DOCUMENTS

| | | | |
|---|---|---|---|
| 3,835,270 | 9/1974 | Dufresne | 74/471 XY |
| 3,899,698 | 8/1975 | Kleinschmidt | 340/365 A |
| 4,078,226 | 3/1978 | Eer Nisse | 310/311 |
| 4,297,542 | 10/1981 | Shumway | 200/6 A |
| 4,318,096 | 3/1982 | Thornburg | 340/706 |
| 4,393,268 | 7/1983 | Guedj | 178/18 |
| 4,465,908 | 8/1984 | Griffith | 200/6 A |

Primary Examiner—John W. Caldwell, Sr.
Assistant Examiner—Michael F. Heim
Attorney, Agent, or Firm—Cahill, Sutton & Thomas

[57] ABSTRACT

The present invention can be used either as a joystick controller having three dimensions of control or as a three dimensional pressure sensor for signature verification or other purposes. The invention comprises a flexible web including a first deflection zone which extends between first and second spaced apart points on the web. A second deflection zone extends between third and fourth spaced apart points on the web. The first and second deflection zones intersect to divide each of the zones into first and second sections. A first fixed yoke includes first and second arms which are coupled to the first and second points on the web. A second floating yoke includes first and second arms which are coupled to the third and fourth points on the web. A web deflection device is coupled to the second yoke to transmit the mechanical input deflections to the web. Sensor means is coupled to the first and second deflection zones of the web for generating an electrical output signal representative of the mechanical input displacements.

21 Claims, 11 Drawing Figures

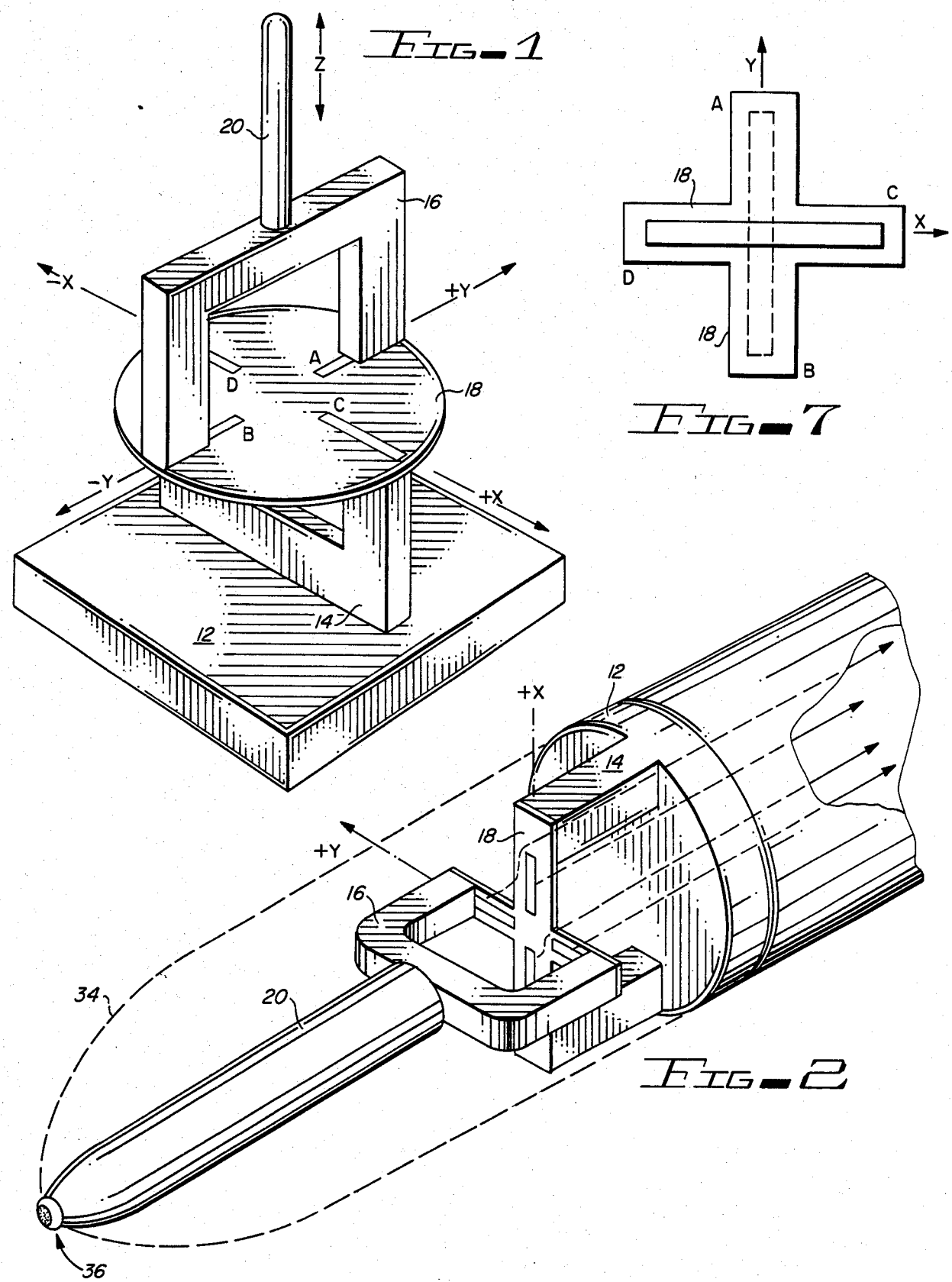

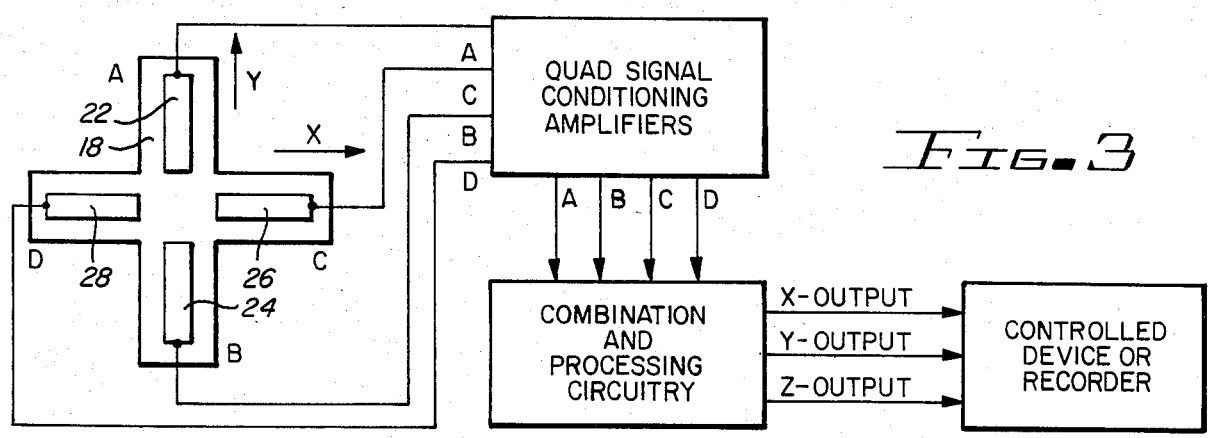
FIG. 3
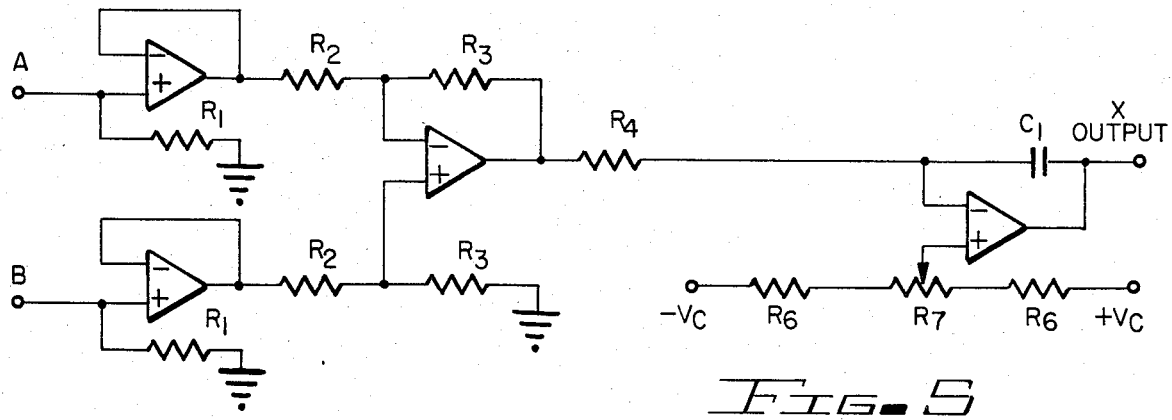
FIG. 5
FIG. 6
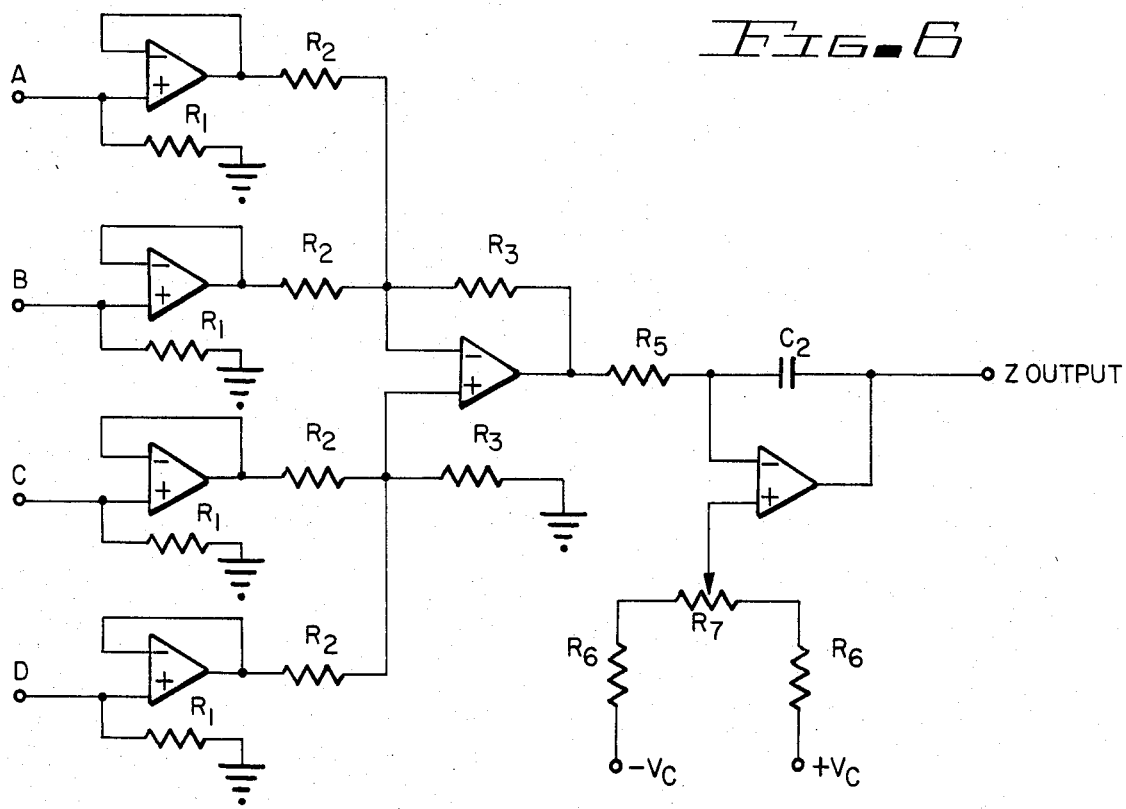

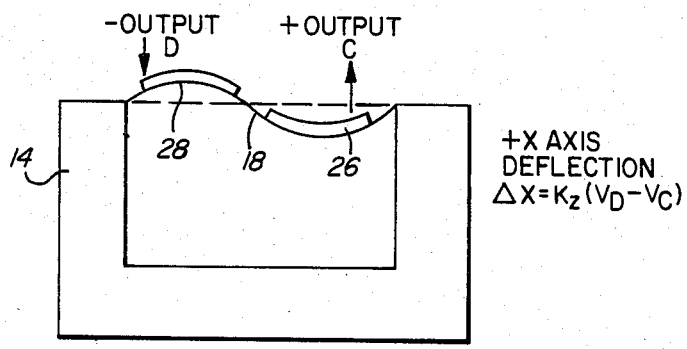
*Fig. 4A*
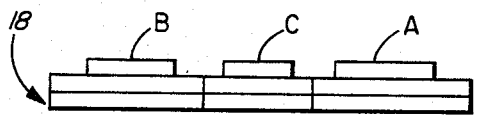
*Fig. 8A*
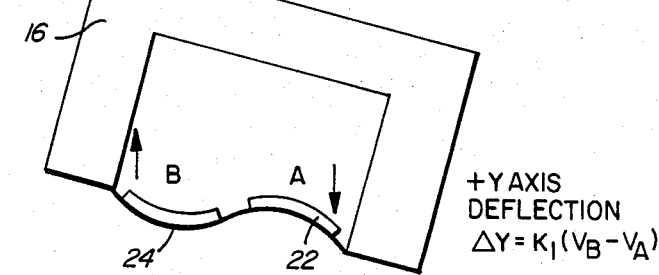
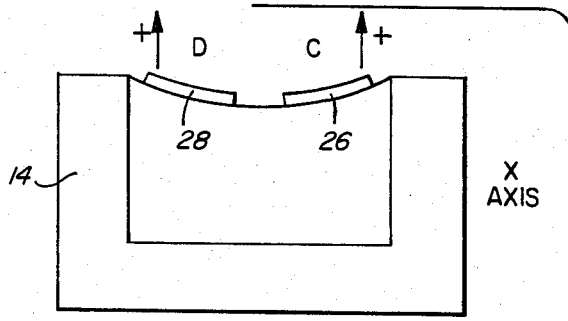
*Fig. 4B*
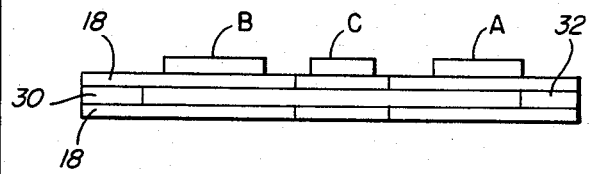
*Fig. 8B*
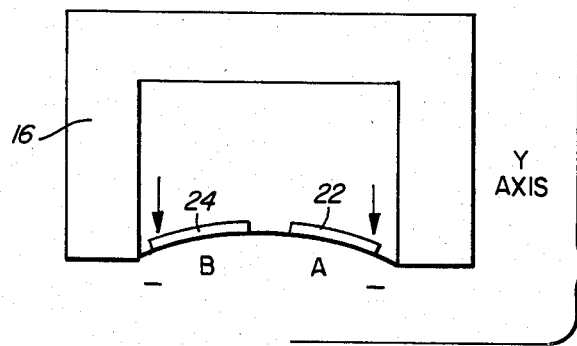
*Fig. 4C*

TRANSDUCER FOR CONVERTING THREE DIMENSIONAL MECHANICAL INPUT DISPLACEMENTS INTO A CORRESPONDING ELECTRICAL OUTPUT SIGNAL

BACKGROUND OF THE INVENTION

1. Field of the Invention

This invention relates to transducers for converting mechanical input signals into a corresponding electrical output signal and, more particularly, an apparatus for converting three dimensional displacements into an electrical output signal having X, Y and Z components.

2. Description of the Prior Art

A wide variety of joystick controllers having three dimensions of control and devices for converting a force vector into an electrical signal having X, Y and Z components are disclosed in the prior art. U.S. Pat. No. 3,693,425 (Starita) discloses a force measuring apparatus which includes a circular base element to which four vertically oriented fixed supports are coupled at ninety degree intervals. Each vertically oriented fixed support includes a horizontally oriented support beam and a grouping of four circumferentially positioned strain gauges. The periphery of a centrally located input device is coupled to the surrounding horizontally oriented support beams. Displacements of that input device ultimately deflects the grouping of sixteen strain gauges to generate an electrical output signal representative of the X, Y and Z components of the input displacement.

U.S. Pat. No. 4,078,226 (EerNisse) discloses a signature verification system which includes a first set of strain gauges positioned within a writing instrument and a second set of strain gauges positioned within a horizontally oriented writing platen. The writing instrument includes two parallel oriented piezoelectric transducers which are coupled to opposing sides of a ball point pen refill within the writing instrument. Deflection of the tip of the ball point pen refill deflects the two piezoelectric strain gauges in the writing instrument to generate an electrical output signal representative of the X and Y components of the force vector applied to the writing instrument. In the horizontally oriented writing platen, three spaced apart piezoelectric pressure sensors measure the Z component of the force vector applied to the writing platen. Various electronic devices process the electrical output signal from this system to produce a signal representative of the X and Y components of the force vector related to the pen which is tilted at some arbitrary angle with respect to the writing platen and also the Z component of the force normal to the platen surface. These force versus time records may then be utilized to verify whether a signature is genuine.

U.S. Pat. No. 3,998,934 (Kamphoefner) discloses a handwriting sensing and analyzing apparatus. This device includes a horizontally oriented writing platen which is coupled to an intermediate support structure by two tabs each of which includes a pair of strain gauges. The intermediate support structure is coupled to a supporting frame by an orthogonally aligned pair of tabs which include two additional pairs of strain gauges. A third grouping of strain gauges is coupled to the apparatus to measure the Z axis force components produced by the writing instrument.

U.S. Pat. No. 3,640,130 (Spescha) discloses a force measurement apparatus which includes a fixed base member and an active or movable upper member. A plurality of twelve strain gauges is coupled to electronic processing circuits which convert an input force vector into an electrical signal which is representative of the X, Y and Z components of the input force vector.

U.S. Pat. No. 4,046,005 (Goroski) discloses a three axis joystick controller. The non-movable joystick controller uses four spaced apart strain gauges to convert forces applied to the joystick into an electrical output signal representative of desired, X, Y and Z components of the control signal. The Z axis control input is created by applying a torque to the cylindrical body of the joystick controller. U.S. Pat. No. 4,217,569 (Njedly) discloses a three dimensional strain gauge transducer somewhat similar to the three axis joystick control device disclosed in the Goroski patent. The Njedly joystick controller can be deflected in two dimensions, but also generates a Z axis output signal by permitting the input shaft of the controller to be rotated.

U.S. Pat. No. 3,561,280 (MacPhee) discloses a three axis strain gauge control device which includes six strain gauges. Displacement of the flexible input shaft of the control device generates output signals representative of the desired X and Y control inputs. Vertical displacement of the control device generates the Z axis output signal by internally displacing a cantilever beam attached to the lower end of the shaft.

SUMMARY OF THE INVENTION

It is therefore a primary object of the present invention to provide an apparatus for converting a three dimensional mechanical input signal into a corresponding electrical output signal which includes only two primary moving parts.

Another object of the present invention is to provide an apparatus for converting a three dimensional mechanical input signal into a corresponding electrical output signal which generates the output signal by deflecting only a single monolithic element.

Another object of the invention is to provide an apparatus for converting the three dimensional mechanical input signal into a corresponding electrical output signal which can readily be miniaturized to fit within the interior of a writing instrument or some other small force sensing device.

Another object of the invention is to provide an apparatus for converting the three dimensional mechanical input signal into a corresponding electrical output signal which can be readily modified to alter the forces required to produce either X or Y axis mechanical input displacements.

Another object of the invention is to provide an apparatus for converting the three dimensional mechanical input signal into a corresponding electrical output signal which includes a web which flexes to allow semi-independent displacements of two sections of the web.

Another object of the invention is to provide an apparatus for converting the three dimensional mechanical input signal into a corresponding electrical output signal wherein selected components of said apparatus can readily be modified to produce electrical output signals having a magnitude within a desired range.

Briefly stated, and in accord with one embodiment of the invention, apparatus for converting three dimensional mechanical input displacements into an electrical output signal representative of said displacements comprises a flexible web including a first deflection zone extending between first and second spaced apart points on the web and a second deflection zone extending between third and fourth spaced apart points on the web, wherein the first and second deflection zones intersect to divide each of the zones into first and second sections. A first fixed yoke including first and second arms is coupled to the first and second points on the web. A second floating yoke including first and second arms is coupled to the third and fourth points on the web. Web deflection means is coupled to the second yoke for transmitting the mechanical input deflections to the web. Sensor means is coupled to the first and second deflection zones of the web for generating electrical output signals representative of the mechanical input displacements.

DESCRIPTION OF THE DRAWINGS

The invention is pointed out with particularity in the appended claims. However, other objects and advantages together with the operations of the invention may be better understood by reference to the following detailed description taken in connection with the following illustrations, wherein:

FIG. 1 is a perspective view of one preferred embodiment of the invention.

FIG. 2 is a perspective view of a second preferred embodiment of the invention coupled to and enclosed within the housing of a ball point pen.

FIG. 3 is a block diagram representation particularly indicating the manner in which the four output signals from the invention are processed to generate independent X, Y and Z axis electrical output signals.

FIGS. 4A-C represent simplified diagrammatic illustrations of the manner in which various piezoelectric strain gauge elements of the present invention are deflected to create electrical output signals representative of the X, Y or Z components of a mechanical input displacement.

FIG. 5 is an electrical schematic diagram of a signal conditioning amplifier which processes the electrical output signal from sensors A and B to generate an X axis electrical output signal.

FIG. 6 is an electrical schematic diagram of the circuitry which receives and processes input signals from each of the four sensors to generate a Z axis electrical output signal.

FIG. 7 depicts yet another embodiment of the invention which utilizes a different piezoelectric sensor configuration to generate increased magnitude output signals.

FIGS. 8A-B depict two different methods of altering the rigidity of flexibility of the web of the present invention.

DESCRIPTION OF THE PREFERRED EMBODIMENT

In order to better illustrate the advantages of the invention and its contributions to the art, a preferred hardware embodiment of the invention will now be described in detail.

Referring now to FIGS. 1, 3 and 4, the transducer 10 of the present invention includes a base 12, a first fixed yoke 14, a second floating yoke 16, a flexible web 18 and web deflection means or joystick 20.

Although web 18 as depicted in FIG. 3 will normally take the form of a cross or "+", alternative, circular configuration of web 18 is depicted in FIG. 1. The cross or "+" configured web 18 may be preferred over a circular or other equivalent configuration of web 18 for the purpose of decreasing the mechanical X and Y axis mechanical cross coupling to thereby reduce unwanted electrical outputs.

For the purpose of discussion, the four arms of the "+" configured web 18 of the present invention will be referred to as arms A, B, C and D. Arms A and B lie within a first deflection zone which extends between the first and second spaced apart ends of web 18. Arms C and D lie within a second deflection zone which extends between the third and fourth spaced apart ends of web 18. The intersection of the first and second deflection zones in the mid or center section of web 18 divides each of those two deflection zones into first and second sections. Strain gauges 22 and 24 are coupled respectively to sections A and B of the first deflection zone. Strain gauges 26 and 28 are coupled respectively to sections C and D of the second deflection zone. Strain gauges 22 and 24 generates the Y-axis component of the electrical output signal, while strain gauges 26 and 28 generate the X-axis component of the electrical output signal. The outputs of strain gauges 22, 24, 26 and 28 are combined to produce a signal electrical output signal corresponding to the Z-axis displacement component of the mechanical input.

In the preferred embodiment of the invention, strain gauges 22, 24, 26 and 28 comprise thin piezoelectric bi-morph or monomorph detectors and are bonded to the surface of the electrically conductive web 18. These detectors are typically composed of lead zirconium titanate or lead lanthanum zirconium titanate. For web dimensions of one inch tip-to-tip and with a web arm of from one quarter inch to one half in width, each sensor will typically have the following dimensions: 0.4 inches length; 1.1 inch width; 0.01 inch-0.02 inch thickness. Piezoelectric sensors of the type described above are commercially available from the Ceramics Division of the Motorola Corporation and can be bonded to web 18 by a two component epoxy adhesive or by other common cement products. Electrical leads are bonded to the outer ends of each sensor by using techniques well known in the art. With sensors of this specific configuration, sensor output voltages on the order of one volt have been achieved into high impedance input circuitry as a result of joystick displacements of approximately ten to fifteen degrees from the vertical. Increased sensor length and correspondingly enhanced sensor sensitivity may be achieved by using the sensor structure and mounting technique depicted in FIG. 7 in which a single sensor with two electrical regions is coupled to the lower surface of web 18 and spans substantially the entire length of web sections A and B, while a section similar sensor is coupled to the upper surface of web 18 and spans substantially the entire length of sections C and D.

Referring now primarily to FIG. 4, the specific operating modes of the invention will now be described in detail. FIG. 4A depicts a positive X-axis tilting deflection of joystick 20. The +X axis web section "C" is thereby deflected downward and assumes a concave downward configuration. The −X axis web section "D" is also deflected and assumes a convex upward configuration. The sensor elements utilized in the preferred embodiment of the present invention generate a positive output voltage when deflected into the concave downward configuration of sensor 26 in FIG. 4A and generate a negative output voltage when deflected into the convex upward configuration of sensor 28 in FIG. 4A. This same positive X-axis deflection of joystick 20 causes the two Y-axis arms A and B to be twisted along the Y-axis. Sensor A is twisted in a clockwise direction while sensor B is twisted in a counterclockwise direction. The output voltages from sensors A and B resulting from this distortion are comparatively small for the following reasons. The length of each detector is substantially greater than its width for the purpose of minimizing unwanted torsional deformation errors; the torsional deformation response to the sensors is a second order function and is inherently small relative to the bending mode output; and the cross-shaped configuration of web 18 reduces the torsional mode cross feed between the X and Y axes. In most cases, the voltage output from sensors A and B caused by an X-axis deflection of joystick 20 is comparatively small and may be neglected.

The positive deflection of joystick 20 along the X-axis produces sensor output voltages which are directly proportional to the X-axis displacement. The following equation describes the relationship between the mechanical displacement of joystick 20 and the electrical output from X-axis sensors C and D:

$$\Delta X = K_1(V_D - V_C) \qquad \text{Equation 1}$$

If joystick 20 is moved in the $-X$ direction, the polarity of the output voltage from sensors C and D is reversed.

Deflection of joystick 20 in the $+Y$ axis direction deflects sensors A and B and operates to generate electrical output signals in precisely the manner as described above in connection with sensors C and D. The equation for deflections of joystick 20 along the Y-axis can be expressed as follows:

$$\Delta Y = K_2(V_B - V_A) \qquad \text{Equation 2}$$

If a force is exerted vertically downward along the $-Z$ axis of joystick 20, as depicted in FIG. 4C, the outer edges of web arms A and B are deflected upward while the outer ends of web arms C and D are deflected downward. Sensors A and B therefore produce a positive output voltage while sensors C and D produce a negative output voltage. Z component deflections of joystick 20 therefore cause each of the sensors to produce an output signal. The corresponding Z-axis voltage contribution can be expressed as follows:

$$\Delta Z = K_3(V_C + V_D - V_A - V_B) \qquad \text{Equation 3}$$

Referring now to FIGS. 3, 5 and 6, the electrical circuitry which performs the voltage summations expressed above in Equations 1, 2 and 3 will now be described. Web 18 is electrically grounded. A single electrical lead is coupled to the outer end of each separate sensor. An individual output lead from each of the sensors A, B, C and D is coupled to quad signal conditioning amplifiers of the type well knon to one of ordinary skill in the art. The conditioned output signals are then coupled to combination and processing circuitry of the type depicted in FIGS. 5 and 6. The circuitry illustrated in FIG. 5 combines the electrical output from sensors A and B by utilizing the op amps, capacitors and resistors illustrated. Table 1 which appears at the end of the specification illustrates typical values for each of the component parts utilized in the circuitry depicted in FIGS. 5 and 6.

Since the Y output is derived by combining the electrical output signals from sensors C and D, circuitry identical to that depicted in FIG. 5 is utilized to generate an electrical output signal corresponding to the Y axis component of the mechanical input deflection. FIG. 6 represents an electrical schematic diagram of circuitry which can be utilized to combine the electrical outputs from sensors A, B, C and D in the manner indicated in Equation 3 above to produce an electrical output signal representative of the z axis component of the mechanical input to joystick 20. Representative values of the components utilized in the FIG. 6 schematic diagram are disclosed in Table 1.

An important feature of the response of joystick 20 to an applied force is that the resulting displacement of web 18 is not a linear function of the applied force. A disproportionately larger force is required to produce larger displacements of joystick 20 due to the approximate correspondence between the web and the quadratic spring equation:

$$\text{Force}_X = K_1 X^2 \qquad \text{Equation 4}$$

Equation 4 indicates that a force of four units is required to produce an X-axis displacement of two units. This characteristic of web 18 permits a broad range of forces to be utilized in the control function and a large range of forces to be measured when the transducer of the present invention is employed as a pressure or other force sensor.

Another highly significant feature of the present invention is that the mechanical response to applied forces can readily be adjusted over a wide range by using a composite web 18 of the type depicted in FIG. 8B or by changing the thickness and configuration of a single web as is depicted in FIG. 8A. The mechanical response of joystick 20 can be significantly modified by either increasing or decreasing the number of webs 18 utilized in the manner indicated in FIG. 8A. Either increasing the thickness of web 18 or increasing the number of web units utilized permits the transducer of the present invention to deal with substantially larger ranges of input force magnitudes.

To achieve the web configuration depicted in FIG. 8B, a plurality of four spacers, such as spacers 30 and 32 are coupled to the ends of each of the four sections of web 18. In this configuration the mechanical response of each arm of web 18 can be regarded as a bending beam in which the stiffness of the arm depends on the square of its thickness. By fabricating a web comprising two flat elements connected only at the ends, the stiffness or rigidity of web 18 is significantly increased without a significant increase in mass. The torsional stiffness of this particular web configuration also is significantly increased which produces a correspondingly significant reduction in unwanted cross feed between the X and Y axes. It has been found that by utilization of the spaced apart web structure disclosed in FIG. 8B, the force required to achieve a predetermined X and Y axis deflection can be increased by a factor of 10, while the force required to achieve a predetermined Z axis force is increased by only a factor of 3. By utilizing X-axis spacers, the response of the present invention to X, Y and Z axis deflections can be independently modified. This has the effect of modifying the constants $K_1$, $K_2$ and $K_3$ of Equations 1, 2 and 3 above and indicates that these constants may be independently controlled to taylor the response of the web to fit particular system requirements.

By modifying the length of joystick input arm 20 and by modifying the size and configuration of web 18, the transducer of the present invention may be readily modified to produce a ten degree deflection in a desired plane by the application of either a fraction of one ounce of force or many pounds of force. The specific application of the invention will determine where within this broad range that a desired response function should be placed.

Referring now to FIG. 3, the transducer of the present invention is shown configured as a pressure sensing device for the purpose of signature verification and is positioned within a writing instrument such as a ball point pen housing. In this configuration, the overall dimension of web 18 must not exceed approximately three tenths of an inch. Joystick 20 may take the form of a ball point pen writing unit or any other equivalent writing instrument. The outer end of writing instrument 20 extends through the housing 34 of the instrument. A cylindrical gap designated by reference number 36 must be maintained between the end of writing instrument 20 and the adjacent sides of housing 34 to permit the appropriate X and Y deflections of joystick 20. The overall response or feel of this embodiment of the transducer must be designated so that the writing instrument has a normal "feel" and so that a normally encountered range of Z axis pressures will only produce moderate Z axis deflections of web 18.

This particular embodiment of the transducer of the present invention will therefore for the first time permit real time measurement of the X, Y and Z force components produced while using the writing instrument and could readily be adapted for signature verification purposes by comparing the pressure versus time history of real time handwriting with a stored sample.

It will be apparent to those skilled in the art that the disclosed transducer for converting a three dimensional mechanical input signal into a corresponding electrical output signal may be modified in numerous ways and may assume many embodiments other than the preferred forms specifically set out and described above. For example, many alternative sensor embodiments could be utilized in place of the specific sensors described above. A manganin or other piezoresistive element as well as silicon strain gauges and many other equivalent devices could readily be adapted to operate in connection with the invention disclosed above. In addition, although a cross and circular configurations have been disclosed in connection with the description of web 18 above, it would be readily apparent to one or ordinary skill in the art that various different types of web configurations could be readily adapted to operate in conjunction with the present invention. Similarly, only representative electrical schematic circuit diagrams for processing the electrical output signals have been disclosed. Numerous other and significantly different types of electrical circuitry could readily be adapted to function in connection with the preferred embodiment of the invention disclosed above. Accordingly, it is intended by the appended claims to cover all such modifications of the invention which fall within the true spirit and scope of the invention.

TABLE 1

| Component | Value |
| --- | --- |
| $R_1$ | 15 MΩ |
| $R_2$ | 47KΩ |
| $R_3$ | 3.9KΩ |
| $R_4$ | 150KΩ |
| $R_5$ | 270KΩ |
| $R_6$ | 22KΩ |

TABLE 1-continued

| Component | Value |
| --- | --- |
| $R_7$ | 500KΩ |
| $C_1$ | .47 µF |
| $C_2$ | 1.0 µF |

I claim:

1. Apparatus for converting mechanical input displacements into an electrical output signal representative of said displacements comprising:
   a. a flexible web including a first deflection zone extending between first and second spaced apart points on said web and a second deflection zone extending between third and fourth spaced apart points on said web, said first and second deflection zones intersecting to divide each of said zones into first and second sections;
   b. a first fixed yoke coupled to the first and second points on said web;
   c. a second floating yoke coupled to the third and fourth points on said web;
   d. web deflection means coupled to said second yoke for transmitting the mechanical input displacements to said web;
   e. sensor means coupled to the first and second deflection zones of said web for generating the electrical output signal representative of the mechanical input displacements, wherein said sensor means includes
      i. first means coupled to said first deflection zone for generating an electrical output signal representative of the displacement of the section of said web lying within said first deflection zone; and
      ii. second means coupled to said second deflection zone for generating an electrical output signal representative of the displacement of the section of said web lying within said second deflection zone.

2. The apparatus of claim 1 wherein said first fixed yoke comprises a first U-shaped member.

3. The apparatus of claim 2 wherein said U-shaped member is coupled to a base.

4. The apparatus of claim 2 wherein said second floating yoke comprises a second U-shaped member.

5. The apparatus of claim 4 wherein said first and second U-shaped members are orthogonally coupled to said web.

6. The apparatus of claim 5 wherein said first U-shaped member is coupled to the lower surface of said web and said second U-shaped member is coupled to the upper surface of the web.

7. The apparatus of claim 1 wherein said first and second generating means include first and second strain gauges.

8. The apparatus of claim 7 wherein said first and second strain gauges comprise piezoelectric sensors.

9. The apparatus of claim 1 wherein said first generating means includes:
   a. a first strain gauge positioned within the first section of said first deflection zone; and
   b. a second strain gauge positioned within the second section of said first deflection zone.

10. The apparatus of claim 9 wherein said second generating means includes:
    a third strain gauge positioned within the first section of said second deflection zone; and b. a fourth strain gauge positioned within the second section of said second deflection zone.

11. The apparatus of claim 1 wherein said apparatus is positioned within the interior of a writing instrument and wherein said web deflection means extends through an aperture in said writing instrument for contacting a writing surface.

12. The apparatus of claim 1 wherein said web deflection means includes a joystick controller.

13. The apparatus of claim 1 wherein said web is circular in configuration.

14. The apparatus of claim 1 wherein said web is fabricated in a cross-shaped configuration and wherein said first deflection zone comprises first and second aligned arms of said cross and said second deflection zone comprises third and fourth aligned arms of said cross.

15. Apparatus for converting mechanical input displacements into an electrical output signal representative of said displacements comprising:
   a. a base for supporting said apparatus;
   b. a cross-shaped flexible web including first and second arms intersecting at a ninety degree angle, the intersection of said first and second arms dividing each of said arms into first and second sections;
   c. a first fixed yoke including first and second arms coupled to the first and second sections of said first web arm;
   d. a second floating yoke including first and second arms coupled to the first and second sections of the second arm of said web;
   e. web deflection means coupled to said second yoke for transmitting the mechanical input deflections to said web;
   f. first means coupled to the first and second sections of the first arm of said web for generating an electrical output signal representative of the displacement of the first and second sections of said first arm;
   g. second means coupled to said second arm of said web for generating an electrical output signal representative of the displacements of the first and second sections of said second arm; and
   h. means for combining the electrical output signals produced by said first and second generating means to produce electrical output signals corresponding to the X, Y and Z components of the mechanical input displacements.

16. The apparatus of claim 15 wherein said first fixed yoke includes a first U-shaped member.

17. The apparatus of claim 16 wherein said second floating yoke includes a second U-shaped member.

18. The apparatus of claim 17 wherein said first U-shaped member is coupled to the lower surface of said web.

19. The apparatus of claim 18 wherein said second U-shaped member is coupled to the upper surface of the web.

20. The apparatus of claim 19 wherein said apparatus is positioned within the interior of a writing instrument and wherein said web deflection means extends through an aperture in said writing instrument for contacting a writing surface.

21. Apparatus for converting three dimensional mechanical input displacements into an electrical output signal representative of the x, y and z components of said displacements comprising:
   a. a flexible web including a first deflection zone extending between first and second spaced apart points on said web and a second deflection zone extending between third and fourth spaced apart points on said web, said first and second deflection zones intersecting to divide each of said zones into first and second sections;
   b. a first fixed yoke coupled to the first and second points on said web;
   c. a second floating yoke coupled to the third and fourth points on said web;
   d. web deflection means coupled to said second yoke for transmitting the three dimensional mechanical input displacements to said web and for causing either similar or dissimilar deflections on the first and second sections of said first and second deflection zones, wherein the deflections are representative of the x, y and z components of the mechanical input displacement; and
   e. sensor means coupled to the first and second deflection zones of said web for generating an electrical output signal directly proportional to the mechanical deflections of the first and second sections of said first and second deflection zones.

* * * * *